Figure 1:
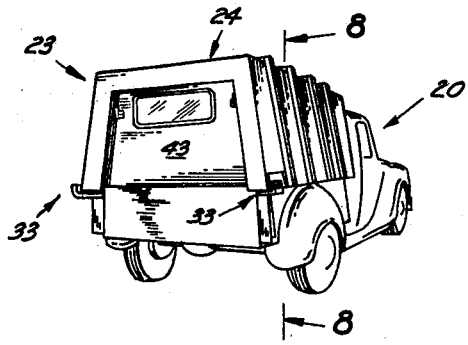

March 10, 1964 S. I. JONAS 3,124,386
CONTROLLABLY EXPANDABLE CAMPER APPARATUS FOR A PICK-UP TRUCK
Filed Jan. 24, 1961 2 Sheets-Sheet 1

INVENTOR.
SUNEE I. JONAS

INVENTOR.
SUNEE I. JONAS

United States Patent Office 3,124,386
Patented Mar. 10, 1964

3,124,386
CONTROLLABLY EXPANDABLE CAMPER
APPARATUS FOR A PICK-UP TRUCK
Sunee I. Jonas, 4125 F St., Bremerton, Wash., assignor of one-tenth to Gadget-Of-The-Month Club, Inc., North Hollywood, Calif., a corporation of California
Filed Jan. 24, 1961, Ser. No. 84,558
5 Claims. (Cl. 296—23)

The present invention consists of apparatus adapted to be carried by a pick-up truck, and which is capable of being easily controllably moved into effectively expanded or enlarged relationship whereby to provide room means defining a camper carried by the pick-up truck at the rear thereof from a point immediately behind the cab of the pick-up truck and extending to a point substantially behind and below the rear end of the pick-up truck. The apparatus is just as easily and quickly moved into nested relationship overlying the pick-up truck bed in a manner occupying a very much smaller space volume than when in the effectively expanded or enlarged position. Thus the pick-up truck can be driven around with the apparatus of the present invention in a small space volume, stored, nested position which is highly advantageous over the conventional practice of driving a large pick-up truck and non-collapsed camper unit around or a large non-collapsed trailer around with all of the attendant problems and difficulties.

Upon arrival at a location where the driver of the truck and family or accompanying persons decide to spend the night, the truck can be stopped and the apparatus of the present invention can be quickly and easily moved into the effectively enlarged and expanded relationship defining a small room immediately above the pick-up truck bed and a larger room extending behind the pick-up truck for a substantial distance and having a floor portion lying below the level of the pick-up truck bed and having a ceiling portion lying above the level of the pick-up truck bed. This can be done in a matter of a few seconds. Then the persons may spend the night in the room regions defined within the effectively enlarged or expanded camper. In the morning the effectively enlarged or expanded camper unit can be quickly moved, in a matter of a few seconds, into the small space volume, nested storage position with all of the elements immediately overlying the pick-up truck bed and occupying no more plan view area than the pick-up truck bed and having a vertical height only slightly more than the pick-up truck cab. Then the truck may be driven to the next destination with no more difficulties or problems involved in driving or handling the pick-up truck than would be customarily encountered in driving a pick-up truck without the camper apparatus of the present invention.

It is an object of the present invention to provide controllably enlargeable camper apparatus for a pick-up truck of the character referred to above which is of relatively simple, cheap, foolproof construction such as to be conducive to widespread use thereof.

Further objects are implicit in the detailed description which follows hereinafter and will be apparent to persons skilled in the art after a careful study thereof.

For the purpose of clarifying the nature of the present invention, one exemplary embodiment is illustrated in the hereinbelow-described figures of the accompanying two sheets of drawings and is described in detail hereinafter.

FIG. 1 is a reduced-size rear oblique view of one illustrative embodiment of the portable camper or shelter apparatus of the present invention in folded-up, small space volume, nested, stored relationship overlying the bed of a pick-up truck.

Figure 2:
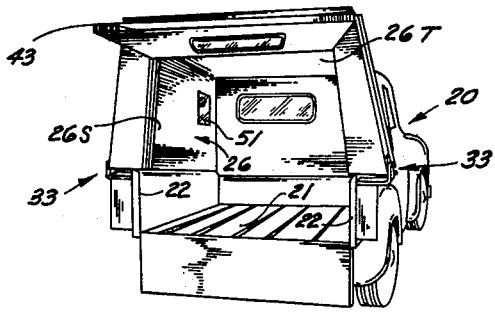

FIG. 2 is a slightly larger-scale rear oblique view showing the nested apparatus of the present invention in effectively open relationship at the rear end thereof. This is accomplished by opening the inner canopy door upwardly and by opening the pick-up truck tail gate downwardly whereby to provide ready access to the interior of the nested, stored, shelter or camper apparatus so that the pick-up truck can be used in a conventional manner for carrying various elements, or things to be carried, on the pick-up truck bed.

Figure 3:
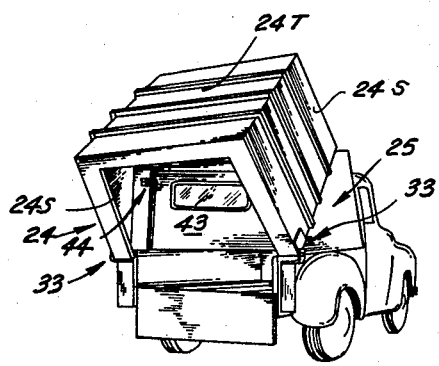
Figure 4:
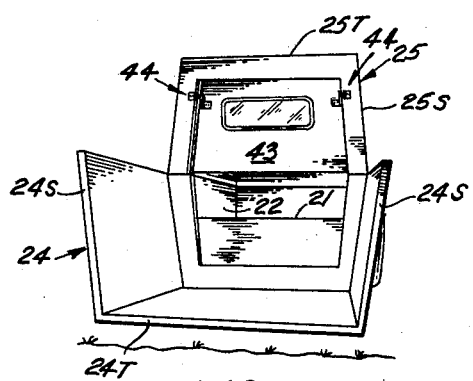

FIG. 3 is a reduced-size rear oblique view generally similar to FIG. 1, but shows the portable foldable camper or shelter apparatus of the present invention in a first stage of the effective expansion or enlargement thereof which consists of pivoting an outer wall-defining portion from its stored and nested position overlying the bed of the pick-up truck and other elements of the camper or shelter assembly, as shown in FIGS. 1 and 2, through the position shown in FIG. 3 into an inverted rearwardly extending, downwardly stepped, position, as shown in FIG. 4, wherein it defines the bottom portion of an additional room lying completely behind the pick-up truck.

FIG. 4 is a rear oblique view showing the first wall-defining portion, which normally lies in the outermost or upper position superimposed over the pick-up truck bed when in the stored position, after it has been pivotally moved rearwardly and downwardly into the fully extended inverted position defining the lower half of an additional room lying completely behind the pick-up truck.

Figure 5:
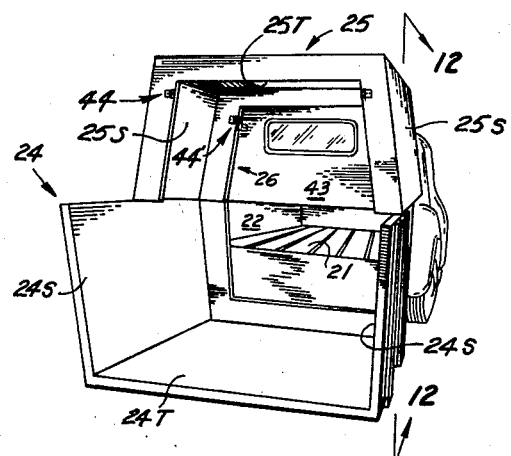
Figure 6:
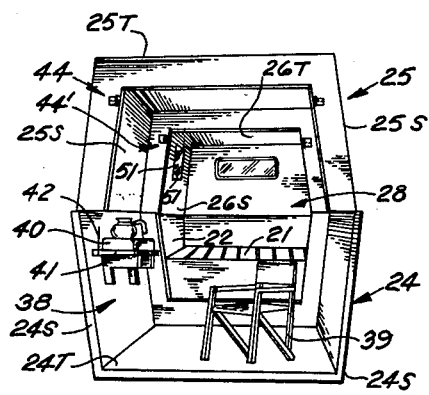

FIG. 5 shows the second wall-defining portion, which normally lies just inside of and under the first wall-defining portion referred to above, in a partially slidably rearwardly extended position between its normal forward position as shown in FIG. 4 and its effectively rearwardly extended position as shown in FIG. 6 wherein it defines the upper half of the additional room which has its lower half defined by the inverted first above-mentioned wall-defining portion; both of said first and second wall-defining portions defining said additional room being positioned behind the rear end of the pick-up truck and effectively comprising an extension thereof in communication with a third wall-defining portion or canopy fixed over the pick-up truck bed and side wall portions in superimposed relationship with respect thereto.

FIG. 6 illustrates the additional rear room lying behind the pick-up truck body and the small forward room defined between the pick-up truck bed, side walls, and the overlying canopy or third wall-defining portion. The additional room in this view is shown as being provided with removable wall-bracket-mounted table and stove means and an auxiliary chair. The small forward room is normally provided in its upper portion with collapsible or removable bunks and in its lower portion with a storage chamber. These are not shown in FIG. 6 for drawing simplification reasons.

Figure 7:
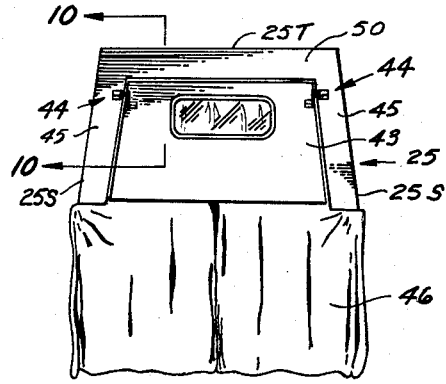

FIG. 7 is a rear elevational view of the apparatus in fully enlarged relationship as shown in FIG. 6 with the door normally carried by the rear of the canopy or third wall-defining portion being repositioned so as to be carried by the rear end of the second wall-defining portion at the top of the rear end of the additional room. This view also shows an additional curtain in mounted relationship across the otherwise open lower part of the rear end of the additional room whereby to provide additional privacy for occupants of the enlarged shelter or camper apparatus.

Figure 8:
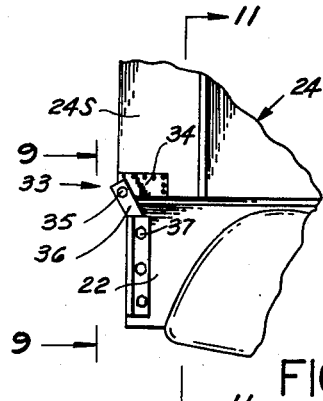

FIG. 8 is an enlarged fragmentary side elevational view of one of the two similarly but oppositely positioned pivotal mounting means which effectively pivotally interconnect each of the rear bottom side edges of the first wall-defining portion to the corresponding ones of the two rear top edges of the side wall parts of the pick-up truck bed for arcuate pivotal movement about a horizontal axis from the small space volume, nested, storage position shown in FIG. 1 and shown fragmentarily in FIG. 8 through the intermediate position shown in FIG. 3 into the rearwardly extended position shown in FIGS. 4–7. It should be understood that each rear bottom side edge of said first wall-defining portion is provided with a similar pivotal mounting means such as the one shown in FIG. 8, although positionally reversed.

Figure 9:
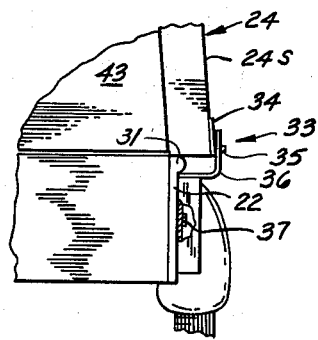

FIG. 9 is a fragmentary rear elevational view of the pivotal mounting means taken in the direction of the arrows 9—9 of FIG. 8.

Figure 10:
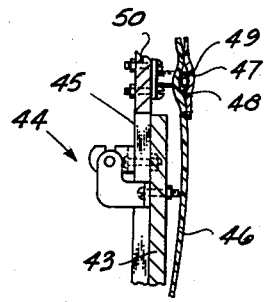

FIG. 10 is a fragmentary sectional view taken in the direction of the arrows 10—10 of FIG. 7 and shows the removable interchangeable pivotal attachment of the hinged canopy door to the otherwise open top part of the rear end of the second wall-defining portion defining the top portion of the additional room. This view also shows the mounting of the flexible curtain to effectively close off the otherwise open bottom of the rear end of the additional room.

Figure 11:
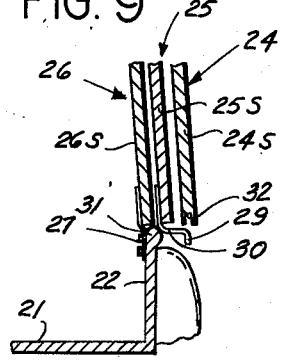

FIG. 11 is a fragmentary sectional view taken in the direction of the arrows 11—11 of FIG. 8 and illustrates the relationship of the three wall-defining portions when in small space volume, nested, storage relationship immediately overlying the pick-up truck bed and side wall parts in the manner shown in FIG. 1.

Figure 12:
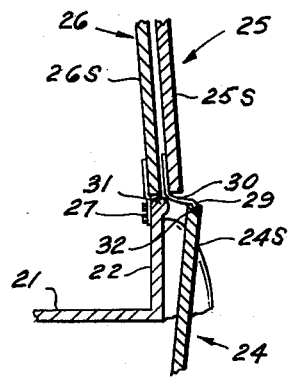

FIG. 12 is a fragmentary view generally similar to FIG. 11 but is taken in the direction of the arrows 12—12 of FIG. 5 and shows the relationship of the three wall-defining portions after the first wall-defining portion has been pivotally moved from the stored position shown in FIG. 1 through the intermediate position shown in FIG. 3 into the effectively rearwardly extended position shown in FIGS. 4 and 5 and after the second wall-defining portion has been partially slidably extended along and immediately above said inverted first wall-defining portion. This view shows detail of the tongue-and-groove means comprising the slidable engaging means which allows the second wall-defining portion to be slidably moved from the forward position shown in FIG. 4 into the effectively rearwardly slidably extended position shown in FIG. 6.

Referring to the figures for exemplary purposes, one illustrative embodiment of the invention takes a typical exemplary form wherein it is adapted to be carried by a pick-up truck such as the one indicated generally at 20 in FIG. 1 in a manner such as to normally overlie or be positioned in superimposed relationship over the pick-up truck bed 21 including the spaced parallel side wall parts 22 whereby to extend upwardly from said spaced parallel side wall parts 22 of the pick-up truck bed in the form of an inverted U-shaped configuration. This is the normal small-space-volume, nested, stored configuration of the folded portable shelter or camper apparatus of the present invention, which is designated generally by the reference numeral 23.

It should be noted that the nested, stored shelter or camper apparatus, indicated generally by the reference numeral 23, includes a first outer wall-defining portion, indicated generally at 24, of substantially inverted U-shape configuration, a second intermediate wall-defining portion, indicated generally at 25, of substantially inverted U-shaped configuration and a third inner wall-defining portion or canopy, indicated generally at 26, of substantially inverted U-shape configuration and normally fastened to the upstanding side wall parts 22 of the pick-up truck bed by suitable fastening means, such as is indicated at 27, whereby said third or inner wall-defining portion 26 effectively defines with the side wall parts 22 and bottom part 21 of the pick-up truck bed a small forward room inside of the intermediate inverted U-shaped wall-defining portion 25 and the outer inverted U-shaped wall-defining portion 24 when the folded shelter or camper apparatus, indicated generally at 23, is in the nested or stored relationship shown in FIGS. 1 and 11.

It should be noted that the first or outer wall-defining portion, indicated generally at 24, includes two substantially upright longitudinal side portions 24S and an interconnecting transverse longitudinal portion 24T. It should also be noted that the second or intermediate wall defining portion 25 is similarly formed and includes two substantially upright longitudinal side portions 25S and an interconnecting longitudinal transverse portion 25T. It should also be noted that the third or inner wall-defining portion or canopy, indicated generally at 26, is of similar configuration and includes two substantially upright longitudinal side portions 26S and an interconnecting longitudinal top portion 26T, all being rigidly fastened in inverted U-shaped configuration above the side wall parts 22 of the truck bed 21 whereby to define a small forward room designated generally by the reference numeral 28.

It should be noted that the lower edge of each of the longitudinal side portions 25S of the second or intermediate wall-defining means are provided with similar tongue means 29 having offset portions 30 which slidably engage the similar top edges 31 of the side wall parts 22 of the pick-up truck bed 21 whereby said second or intermediate wall-defining portion, indicated generally at 25, may be slidably moved along the top edges 31 of the side wall parts 22 of the pick-up truck bed 21 for slidable rearward extension in a manner and for purposes which will be described in greater detail hereinafter.

It should also be noted that the bottom edges of the two longitudinal side portions 24S of the first wall-defining portion, indicated generally at 24, are provided with similar groove means 32 adapted to slidably receive the tongue means 29 in the manner shown in FIG. 12 after said first wall-defining portion, indicated generally at 24, is pivoted from the small space volume, nested, storage position shown in FIGS. 1 and 11, through the intermediate position shown in FIG. 3 into the extended position shown in FIG. 4. Then said second or intermediate wall defining portion, indicated generally at 25, may be slidably moved from the forward position shown in FIG. 4 through the intermediate position shown in FIG. 5 into the effectively rearwardly extended position shown in FIG. 6 immediately overlying the arcuately pivotally rearwardly extended first wall defining portion, indicated generally at 24, which had previously been arcuately pivotally moved into said rearwardly extended position by pivoting from the position shown in FIG. 1 into the position shown in FIG. 4 around two pivotal mounting means, such as are indicated generally at 33 in FIGS. 1, 2, and 3 and the right one of which is shown in detail in FIGS. 8 and 9.

Each of said pivotal mounting means, indicated generally at 33, includes a steel plate 34 riveted or otherwise suitably fastened to the lower rear corner of the longitudinal side portions 24S of the first wall-defining portion, indicated generally at 24, with each of said steel plates 34 being provided with an outwardly projecting pivot pin 35 pivotally received within an angle iron strap 36 which is rigidly fastened by fastening means 37 to the outer surface of the rear end of the side wall parts 22 of the truck bed 21.

This provides an arrangement where the first wall-defining portion, indicated generally at 24, may be quickly and easily pivoted from the nested position shown in FIGS. 1, 8, and 11 through the intermediate position shown in FIG. 3 into the effectively rearwardly extended position shown in FIG. 4, after which the second or intermediate wall-defining portion, indicated generally by the reference numeral 25, may be slidably rearwardly extended thereover by means of the slidable engagement of the tongues 29 in the grooves 32 in the manner described hereinbefore, until the second or intermediate wall-defining portion, indicated generally at 25 is in the fully rearwardly extended position shown in FIG. 6, whereby to effectively define, together with the lower first wall defining portion indicated generally at 24, an additional room indicated generally by the reference numeral 38.

It should be noted that the rear additional room, indicated generally at 38, is in communication with the somewhat smaller forward room, indicated generally by the reference numeral 28, thus providing a very substantial space volume within the effectively enlarged portable shelter or camper.

Normally the small forward room 28 may be provided at a location above the bottom part 21 of the truck bed, which forms the floor thereof, with collapsible or removable bunks or bed structures which will allow the lower portion of said small forward room 28 to be used for storage of various objects. Also normally the larger rear additional room, indicated generally at 38, may be used for various purposes. In FIG. 6 it is shown with an auxiliary chair 39 (although several chairs may be positioned in the room) and is shown with a small stove 40 and table means 41 removably supported by suitable bracket means 42 on one of the side wall portions 24S of the first wall defining portion indicated generally at 24. It should be understood that various other accessory items may be suitably positioned within either of the room portions 28 or 38.

The third or inner wall-defining portion or canopy, indicated generally at 26, which is normally rigidly fastened over the side wall parts 22 of the pick-up truck bed 21, is normally provided with a removably hinged rear door means 43 which is interchangeably cooperable with the corresponding rear portion of the slidably rearwardly extended second or intermediate wall defining portion indicated generally at 25. This is shown in FIGS. 7 and 10 wherein said rear door means 43 has been removed from the rear end of the third wall-defining portion 26 and has been reconnected by disengageable hinge means, indicated generally at 44, to laterally spaced side members which extend upwardly across the rear side parts of said second or intermediate wall-defining portion 25. This provides an arrangement whereby the hinged door 43 is mounted for ready opening and closing movement and whereby it can be removed when desired and replaced in similar hinged engagement (with similar hinge means 44') at the rear end of the third wall-defining portion or canopy 26 when desired.

Also, FIGS. 7 and 10 illustrate the mounting of a flexible curtain 46 across the rear end of the additional room 38 by means of a hem portion 47 defining an opening 48 which slides on a conventional curtain rod 49 which is mounted on the inside of the transverse member 50. This provides an arrangement whereby the flexible curtain 46 hangs in the depending relationship shown in FIGS. 7 and 10 and can be conveniently moved to either side or removed entirely when desired.

It should be noted that any or all of the wall-defining portions may be provided with suitable window means, if desired, such as the window means indicated at 51 in the side portions 26S of the third or inner wall-defining portion or canopy indicated generally at 26.

The various wall-defining portions may be made of any suitable material such as wood paneling, plastic material, aluminum or other metallic thin-sheet material, or, in certain cases, may be formed wholly or in part of fabric or fibrous materials provided with suitable structural support members to maintain the proper shape of the assembled wall-defining means.

The pivotal mounting means and the tongue-and-groove slidable engagement means may be modified substantially within the basic spirit, scope, and/or teachings of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A combination pick-up truck and controllably expandable camper comprising: a pick-up truck having a rearwardly directed horizontal bed provided with laterally spaced parallel upstanding side wall parts terminating in upper edges; a first wall-defining portion of substantially inverted U-shaped configuration normally overlying the bed of the pick-up truck and substantially coextensive with the plan view area thereof, said first wall-defining portion being provided with pivotal mounting means at rear bottom edges thereof fixedly attached to upper rear corner portions of the side wall parts of the pick-up truck bed for arcuate pivotal movement of said first wall-defining portion about a horizontal axis from said position superimposed over the pick-up truck bed into a rearwardly extended position lying behind and partially below the pick-up truck bed and defining a rearwardly directed partially downwardly stepped extension of the pick-up truck bed; a second wall-defining portion of substantially inverted U-shaped configuration superimposed above the pick-up truck bed in rearwardly slidably mounted relationship with respect thereto and positioned within said first wall-defining portion when in an initial position; said second wall-defining portion having downwardly directed longitudinal lower side edges provided with slidable engaging means; said first wall-defining portion, when in said rearwardly extended position, having upwardly directed longitudinal upper side edges positioned in substantial horizontal alignment with corresponding ones of said upper edges of said side wall parts of the pick-up truck bed and being provided with slidable engaging means adapted to slidably mount corresponding ones of said downwardly directed longitudinal lower side edges and said slidable engaging means carried thereby of said second wall-defining portion for rearward longitudinal slidable movement of said second wall-defining portion into a position directly over said rearwardly extended first wall-defining portion whereby to define therebetween a rearwardly extended auxiliary room lying behind the pick-up truck bed; and a third wall-defining portion of substantially inverted U-shaped configuration fixedly mounted over the pick-up truck bed within the first and second wall-defining portions whereby, when said first and second wall-defining portions have been, respectively, moved into their rearwardly extended room-defining cooperative positions, said third wall-defining portion defines a forward room extension communicating with said rearwardly extended auxiliary room.

2. Apparatus of the character defined in claim 1, wherein said first wall-defining portion includes two substantially upright longitudinal side portions and an interconnecting longitudinal portion defining a substantially inverted U-shaped structure when in the initial position superimposed over the pick-up truck bed, and defining a substantially U-shaped structure when pivoted into the rearwardly extended position comprising an effective extension of the pick-up truck bed, with said interconnecting longitudinal portion lying in a plane parallel to but below the pick-up truck bed.

3. Apparatus of the character defined in claim 1, wherein said slidable engaging means of said first wall-defining portion and said slidable engaging means of said second wall-defining portion together comprise tongue-and-groove means including, when slidably engaged, vertically adjacent tongue means and tongue-receiving groove means relatively longitudinally slidably engaging each other.

4. Apparatus of the character defined in claim 1, including removable hinged door means interchangeably cooperable with the rear end of said third wall-defining portion and the rear end of said second wall-defining portion.

5. Apparatus of the character defined in claim 1, including closure curtain means cooperable with the rear end of said second wall-defining portion for effectively closing same.

References Cited in the file of this patent

UNITED STATES PATENTS

| | | |
|---|---|---|
| 467,423 | Merritt | Jan. 19, 1892 |
| 1,150,954 | Murphy | Aug. 24, 1915 |